US011738850B2

(12) United States Patent
Thompson

(10) Patent No.: US 11,738,850 B2
(45) Date of Patent: Aug. 29, 2023

(54) AIRFRAME AND METHOD FOR ASSEMBLING AN AIRFRAME

(71) Applicant: BAE Systems plc, London (GB)

(72) Inventor: Gregory Warren Thompson, Balderstone (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 17/789,861

(22) PCT Filed: Jan. 8, 2021

(86) PCT No.: PCT/GB2021/050053
§ 371 (c)(1),
(2) Date: Jun. 29, 2022

(87) PCT Pub. No.: WO2021/148775
PCT Pub. Date: Jul. 29, 2021

(65) Prior Publication Data
US 2023/0046113 A1  Feb. 16, 2023

(30) Foreign Application Priority Data

Jan. 23, 2020 (EP) .................................... 20275012
Jan. 23, 2020 (GB) .................................... 2000979

(51) Int. Cl.
B64C 1/06 (2006.01)
B64F 5/10 (2017.01)
B64C 1/12 (2006.01)

(52) U.S. Cl.
CPC ................ B64C 1/061 (2013.01); B64C 1/12 (2013.01); B64F 5/10 (2017.01)

(58) Field of Classification Search
CPC ...................................................... B64C 1/12
See application file for complete search history.

(56) References Cited

U.S. PATENT DOCUMENTS 1,946,408 A     2/1934 Loudy
4,079,903 A  *  3/1978 Ashton ..................... B64C 3/00
                                                          416/241 A
(Continued)

FOREIGN PATENT DOCUMENTS

CN   207450252 U   6/2018
CN   108357673 A   8/2018
(Continued)

OTHER PUBLICATIONS

International Preliminary Report on Patentability for PCT Appl. No. PCT/GB2021/050053 dated Aug. 4, 2022, 10 Pages.
(Continued)

Primary Examiner — Joshua J Michener
Assistant Examiner — Michael B. Kreiner
(74) Attorney, Agent, or Firm — Maine Cernota & Rardin

(57) ABSTRACT

An airframe 1 or part thereof comprises a set of modular cells 10, including a first cell 10A comprising a set of profiles 100 including: a first structural profile 100A, having a first length L1 and enclosing a first volume V1 providing a first passageway P1; and a second profile 100B, having a second length L2 and enclosing a second volume V2, wherein the first passageway P1 is arranged to receive the second profile 100B therein.

20 Claims, 6 Drawing Sheets

(56) References Cited

U.S. PATENT DOCUMENTS

| | | | | |
|---|---|---|---|---|
| 4,538,780 | A * | 9/1985 | Roe | B64C 3/20 |
| | | | | 416/226 |
| 4,824,053 | A * | 4/1989 | Sarh | B64C 3/54 |
| | | | | 244/49 |
| 5,360,500 | A * | 11/1994 | Evans | C04B 35/83 |
| | | | | 423/447.4 |
| 6,394,392 | B1 | 5/2002 | Lafferty | |
| 7,681,835 | B2 * | 3/2010 | Simpson | B64C 3/20 |
| | | | | 428/113 |
| 7,789,343 | B2 * | 9/2010 | Sarh | B64C 3/54 |
| | | | | 244/46 |
| 7,866,610 | B2 * | 1/2011 | Bousfield | B64C 3/56 |
| | | | | 244/46 |
| 9,139,284 | B1 * | 9/2015 | Dhall | B64C 3/26 |
| 10,369,762 | B2 * | 8/2019 | Pereira Mosqueira | B64C 1/12 |
| 10,717,512 | B2 * | 7/2020 | Tyler | B29C 64/209 |
| 11,247,783 | B1 * | 2/2022 | Jeng | B64C 29/0033 |
| 2005/0178912 | A1 | 8/2005 | Whelan | |
| 2013/0075529 | A1 | 3/2013 | Marcoe | |
| 2019/0112025 | A1 | 4/2019 | Sugaki | |
| 2019/0118924 | A1 | 4/2019 | Webb | |
| 2021/0276687 | A1 * | 9/2021 | Georgeson | B29C 48/022 |

FOREIGN PATENT DOCUMENTS

| | | |
|---|---|---|
| CN | 108791878 A | 11/2018 |
| CN | 109455291 A | 3/2019 |
| DE | 102006034862 A | 1/2008 |
| EP | 3296193 A1 | 3/2018 |
| EP | 3604119 A1 | 2/2020 |
| GB | 2547020 A | 8/2017 |
| WO | 2006136804 A1 | 12/2006 |

OTHER PUBLICATIONS

Search Report for GB Patent Appl. No. GB2000979.1 dated Jun. 19, 2020, 3 pages.
Extended European Search Report for EP Patent Appl. No. EP20275012.1 dated Jul. 31, 2020, 11 pages.
Internation Search Report and Written Opinion for PCT Appl. No. PCT/GB2021/050053 dated Apr. 1, 2021, 17 pages.

* cited by examiner

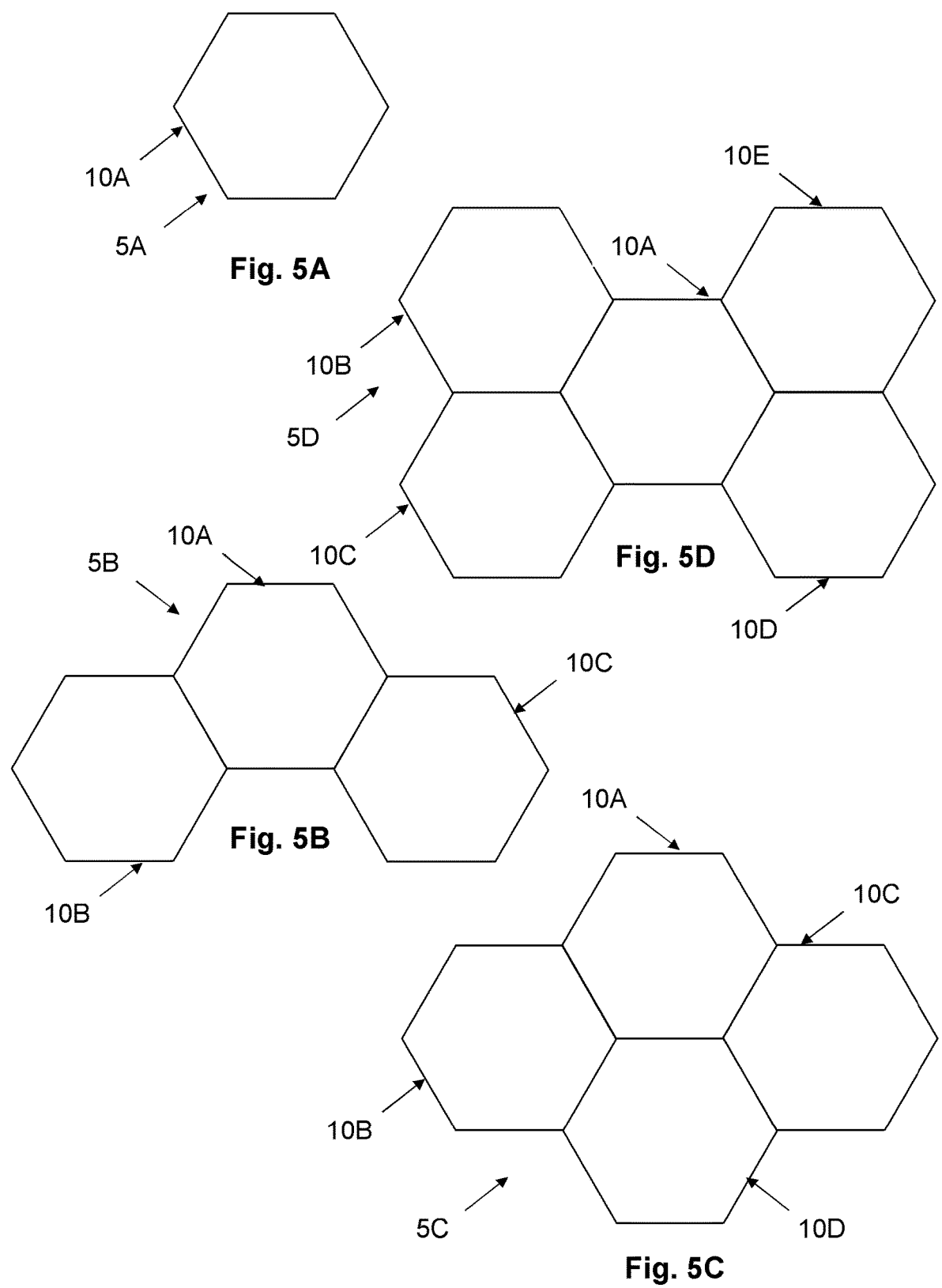

AIRFRAME AND METHOD FOR ASSEMBLING AN AIRFRAME

RELATED APPLICATIONS

This application is a national phase application filed under 35 USC § 371 of PCT Application No. PCT/GB2021/050053 with an International filing date of Jan. 8, 2021, which claims priority of GB Patent Application 2000979.1 filed on Jan. 23, 2020 and EP Patent Application 20275012.1 filed on Jan. 23, 2020. Each of these applications is herein incorporated by reference in its entirety for all purposes.

FIELD OF THE INVENTION

The present invention relates to airframes and methods of assembling airframes.

BACKGROUND

Conventional airframe manufacturing methodologies, such as monocoque or semi-monocoque manufacturing, do not afford reconfiguration, for example according to mission-specific operational requirements.

Hence, there is a need to improve airframes.

SUMMARY OF THE INVENTION

It is one aim of the present invention, amongst others, to provide an airframe and a method of assembling an airframe which at least partially obviates or mitigates at least some of the disadvantages of the prior art, whether identified herein or elsewhere. For instance, it is an aim of embodiments of the invention to provide an airframe that affords reconfiguration. For instance, it is an aim of embodiments of the invention to provide an airframe that facilitates assembly and/or manufacture.

A first aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein.

A second aspect provides a method of assembling an airframe or part thereof comprising a set of modular cells, including a first cell comprising a set of profiles including: a first structural profile and enclosing a first volume providing a first passageway; and a second profile, having a second length and enclosing a second volume;

wherein the method comprises:

inserting the second profile into the first passageway.

A third aspect provides an aircraft comprising an airframe or part thereof according to the first aspect and/or assembled, at least in part, according to the method of the second aspect.

DETAILED DESCRIPTION

According to the present invention there is provided an airframe, as set forth in the appended claims. Also provided is a method of assembling an airframe. Other features of the invention will be apparent from the dependent claims, and the description that follows.

Airframe

The first aspect provides an airframe or part thereof comprising a set of modular cells, including a first cell comprising a set of profiles including: a first structural profile, having a first length and enclosing a first volume providing a first passageway; and a second profile, having a second length and enclosing a second volume, wherein the first passageway is arranged to receive the second profile therein.

In this way, the airframe or part thereof is assembled from the set of modular cells, manufacture of which may be automated so as to provide standard modular cells, for example, facilitating assembly of the airframe or part thereof while also providing for reconfiguration and/or custom configuration of the airframe or part thereof, according to an arrangement of the set of modular cells. In other words, the airframe or part thereof is constructed from a single or multiple sections (i.e. modular cells) of a standardised, mass-produced cell, for example comprising a composite profile or tube (i.e. the first structural profile), which may be flexibly configured, for example according to mission-specific operational requirements, including in-field reconfiguration. In this way, load demands on an internal structure of the airframe or part thereof is reduced and enables introduction of novel aircraft equipping processes. Particularly, the second volume of the second profile may comprise (i.e. house) parts such as a propulsor, a fuel tank, electronics for a control system, surveillance equipment, munitions and/or part thereof, which is then received in the first passageway. These parts may be manufactured separately from the airframe or part thereof, housed in the second profile and subsequently, installed in the first structural profile. In this way, equipping, loading and/or servicing of an aircraft including the airframe or part thereof is facilitated, since second profiles comprising particular or required parts may be received in respective first structural profiles accordingly. Additionally and/or alternatively, the set of modular cells allows for segregated manufacture of the cells and/or the set of profiles including the first structural profile and the second profile, such that second profiles comprising specific parts such as propulsors, for example, may be manufactured remotely from first structural profiles arranged to receive the second profiles therein.

For example, use of a standard modular cell enables manufacturing processes to be fully automated thus ensuring higher quality and consistency along with lower cost in comparison with conventional airframe manufacturing methodologies. The airframe or part thereof aligns with air sectors manufacturing challenges, supporting high-variety, low-volume platforms, low-cost, reduced lead-time manufacture, large unitised parts and delayed differentiation (i.e. downstream customisation). In contrast, current airframe design continues to be based on conventional design and manufacturing methodologies, such that even leading-edge airframe designs incorporating composite materials, for example, tend to mimic existing airframe structures and are thus limited thereby.

Airframe

The first aspect provides the airframe or part thereof.

More generally, in one example, first aspect provides a vehicle frame or part thereof, for example the airframe or the part thereof, a landcraft frame (also known as a vehicle from or chassis) or part thereof, or a watercraft frame or part thereof.

Generally, the mechanical structure of an aircraft is known as the airframe. This structure is typically considered to include the fuselage, undercarriage, empennage and wings, and exclude the propulsor (also known as a propulsion system). In other words, the airframe provides the mechanical structure of the aircraft and lift, via the wings, and supports the propulsor. In one example, the airframe or part thereof comprises and/or provides the fuselage (i.e. an aircraft's main body section). In one example, the airframe or part thereof does not comprise and/or provide the wings. In one example, the airframe or part thereof is of a fixed-winged aircraft. In one example, the airframe or part thereof is of a rotary-winged aircraft. The aircraft may be as described with respect to the third aspect.

Set of Modular Cells

The airframe or part thereof comprises the set of modular cells, including the first cell. In other words, the cells are modules which may be combined to provide the airframe or part thereof. That is, the set of modular cells are fundamental building blocks of the airframe or the part thereof, providing, at least in part, a structure thereof and defining, at least in part, a shape thereof. In one example, the set of modular cells includes C modular cells, wherein C is a natural number greater than or equal to 1, for example 1, 2, 3, 4, 5, 6, 7, 8, 9, 10 or more. In one example, the C modular cells are each as described with respect to the first cell. In one example, the first cell comprises a set of modular sub-cells, including a first sub-cell, generally as described with respect to the first cell. In this way, the first cell may be assembled from the set of modular sub-cells. In one example, the set of modular cells includes the first cell and a second cell, wherein the first cell and optionally the second cell comprises a set of modular sub-cells, including a first sub-cell, generally as described with respect to the first cell. That is, some cells may comprise sub-cells while other cells do not. More generally, in one example, the set of modular cells recursively comprises sets of modular cells.

Set of Profiles

The first cell comprises the set of profiles, including the first structural profile and the second profile. In one example, the set of profiles includes P profiles, wherein P is a natural number greater than or equal to 1, for example 1, 2, 3, 4, 5, 6, 7, 8, 9, 10 or more.

The set of profiles includes the first structural profile, having the first length and enclosing the first volume providing the first passageway. It should be understood that the first structural profile is a structural profile. In one example, the first structural profile is arranged to provide, at least in part, the structure of the airframe and to resist, at least in part, internal and/or external forces in one, two or three dimensions. That is, the first structural profile provides, at least in part, the structural integrity of the airframe. Typically, the airframe of an aircraft provides the fuselage, undercarriage, empennage and wings. Conventionally, fuselage components include stringers, longerons, ribs, bulkheads, frames and formers. The main component of a fixed wing is a wing spar. In other words, the first structural profile performs the function of one or more of these components. It should be understood that the first structural profile is a profile, having a predefined cross sectional shape. In one example, the first structural profile has a constant cross sectional shape and/or dimension (generally, for example, cross-sectional width, height, diameter and/or area) along the first length. In one example, the first structural section has a non-constant cross-sectional shape and/or dimension along the first length. For example, the first structural section may taper or be stepped, for example monotonically, along the first length. In one example, the first structural profile is an outer profile, or example the outermost profile, having an external surface exposed to the ambient, for example. It should be understood that a length of the first passageway corresponds with (for example, is equal to or is at most) the first length of the first structural profile. It should be understood that the first structural profile encloses the first volume. In other words, the first structural profile surrounds, at least in part, the first volume i.e. a lumen. That is, the first structural profile comprises and/or is a hollow structural section. In one example, the first structural profile partially surrounds the first volume. For example, the first structural profile may comprises one or more all portions having one or more perforations therethrough, such as access ports and/or voids for weight reduction. In other words, the first structural profile may provide a frame. For example, the first structural profile may comprises one or more all portions having no perforations therethrough, for example providing a sealable enclosure for the second profile, notwithstanding means, for example an aperture, for receiving the second profile into the first passageway. It should be understood that the first volume provides the first passageway arranged to receive the second profile therein. That is, an internal shape of the first structural profile defines a shape of the first passageway.

The set of profiles includes the second profile, having the second length and enclosing the second volume. In contrast to the first structural profile, the second profile may not be a structural profile, as described with respect to the first structural profile. That is, the first second profile may not provide, at least not substantially (for example less than 50%, at most 25% preferably at most 10%), the structural integrity of the airframe. Hence, in one example, the second profile does not comprise and/or is not a structural profile. Conversely, in one example, the second profile comprises and/or is a structural profile. It should be understood that the second profile is a profile, having a predefined cross sectional shape. In one example, the second profile corresponds with the first structural profile. For example, an external shape and/or dimension of the second profile may correspond with an internal shape and/or dimension of the first structural profile i.e. of the first passageway. That is, the first passageway is arranged to receive the second profile therein. In one example, the second profile has a constant cross sectional shape and/or dimension along the second length. In one example, the second section has a non-constant cross-sectional shape and/or dimension along the second length. For example, the second section may taper or be stepped, for example monotonically, along the second length. In one example, the second profile is an inner profile, or example the innermost profile, not having an external surface exposed to the ambient, for example. It should be understood that a length of the second passageway corresponds with (for example, is equal to or is at most) the second length of the second profile. It should be understood that the second profile encloses the second volume. In other words, the second profile surrounds, at least in part, the second volume i.e. a lumen. That is, the second profile comprises and/or is a hollow structural section. In one example, the second profile partially surrounds the second volume. For example, the second profile may comprises one or more all portions having one or more perforations therethrough, such as access ports and/or voids for weight reduction. In other words, the second profile may provide a frame. In one example, the second profile may comprises one or more wall portions having no perforations therethrough, for example providing a sealable enclosure for the second profile.

In one example, the set of profiles comprises a third profile, generally as described with respect to the second profile. That is, the first passageway may be arranged to receive the second profile and the third profile, for example simultaneously and/or alternately. For example, the first passageway may be arranged to receive the second profile and the third profile simultaneously for example in series, such as end-to-end, or in parallel, such as side-by-side. In this way, specific second and third profiles may be received in the first structural profile together. For example, the first passageway may be arranged to receive the second profile and the third profile alternately for example by replacing the second profile with the third profile. In this way, the second profile may be swapped with the third profile, for example flexibly reconfigured, for example according to mission-specific operational requirements, and/or for maintenance.

Passageway

The first passageway is arranged to receive the second profile therein, as described above. That is, the first passageway has a shape and/or dimension corresponding with a shape and/or dimension of the second profile. In one example, the first passageway is arranged to partially receive the second profile therein. In one preferred example, the first passageway is arranged to fully (i.e. completely) receive the second profile therein. In one example, the first structural profile comprises an aperture, for example an access door such as at an end thereof, arranged to receive the second profile therethrough.

In one example, the first passageway is arranged to slidably receive the second profile therein. In this way, the second profile may be slidably inserted into and/or removed from the first passageway.

In one example, the first passageway comprises no bulkheads therein. In other words, the first passageway may be uninterrupted. More generally, in one example, the first passageway comprises no obstructions. In this way, receiving of the second profile therein may be facilitated.

In one example, an external shape, preferably cross-sectional shape and/or dimension, of the second profile corresponds with, for example is the same as, an internal shape, preferably cross-sectional shape and/or dimension, of the first structural profile (i.e. of the first passageway). In this way, voids (i.e. unfilled volumes) are reduced, thereby improving space utilisation.

In one example, the second volume is configured to comprise and/or comprises a propulsor, a fuel tank, electronics for a control system, surveillance equipment, munitions and/or part thereof. In this way, the airframe or part thereof may be flexibly configured, for example according to mission-specific operational requirements. For example, the same first structural profile, as part of a given airframe or aircraft, may receive therein a particular second profile comprising a fuel tank for a long-range first mission, another particular second profile comprising munitions for a second defence mission and yet another second particular profile comprising surveillance equipment for a third reconnaissance mission.

In one example, the airframe or part thereof is arrangeable in:
  a first arrangement, wherein the second profile is received (i.e. inserted) in the first passageway; and
  a second arrangement, wherein the second profile is removed from the first passageway.

In one example, the airframe or part thereof is repeatedly arrangeable in the first arrangement and in the second arrangement. That is, the second profile may be inserted into and removed from the first passageway, repeatedly.

In one example, the set of modular cells includes a second cell. The second cell may be as described with respect to the first cell. That is, the cells may be similar, notwithstanding that the respective second profiles thereof may comprise different parts such as propulsors, fuel tanks, electronics for control systems, surveillance equipment, munitions and/or parts thereof. In one example, respective first structural profiles of the first cell and the second cell are similar, for example the same and/or mirrors (i.e. paired).

In one example, the first cell and the second cell are mutually coupled. That is, the first cell and the second cell may be coupled (i.e. attached) together. In this way, the airframe or part thereof is composed of a plurality of cells. In one example, the first cell and the second cell are mutually coupled chemically, for example adhesively, by bonding, and/or by fusion, and/or mechanically, for example using mechanical fasteners such as non-releasable fasteners for example non-threaded fasteners (e.g. rivets) and/or releasable fasteners for example clips, rings, toggle bolts, clamps and/or threaded fasteners (e.g. bolts and nuts).

In one example, the first cell and the second cell are mutually releasably coupled, for example mechanically such as using releasable mechanical fasteners. In this way, the first cell and the second cell may be coupled, for example during manufacture of the airframe or part thereof, and uncoupled, for example during maintenance and/or reconfiguration.

In one example, the first cell and the second cell are mutually reconfigurably coupled, for example mechanically, as described above. In one example, the first cell and the second cell are mutually reconfigurably coupled mechanically, using releasable fasteners positioned in pre-determined positions. In this way, the first cell and/or the second cell may be interchanged by other cells.

In one example, the first cell and the second cell are mutually interlockably coupled, for example mechanically. For example, the first cell and the second cell may comprise corresponding mating fixtures, such as pins and/or dovetails, arranged to mutually interlockably couple the first cell and the second cell and thereby resist forces in one, two or three dimensions. For example, the mating fixtures may resist relative axial movement of the first cell and the second cell.

In one example, the set of modular cells includes a third cell and the first cell, the second cell and the third cell are mutually coupled, for example as described with respect to the first cell and the second cell. In this way, the airframe or part thereof may be enlarged to include additional cells. Similarly, the airframe or part thereof may be reduced to include fewer cells.

In one example, the airframe or part thereof is configurable in:
  a first configuration, wherein the first cell, the second cell and the third cell are mutually coupled; and
  a second configuration, wherein the first cell and the second cell are mutually coupled, wherein the first cell and the third cell are mutually coupled and wherein the second cell and the third cell are not mutually coupled.

In this way, the airframe or part thereof may be flexibly configured.

In one example, the airframe or part thereof is repeatedly configurable in the first configuration and in the second configuration. That is, the first cell, the second cell and the third cell may be mutually coupled and uncoupled, repeatedly.

In one example, the airframe or part thereof is configurable in:
  a third configuration, wherein the first cell and the second cell are mutually coupled, wherein the second cell and the third cell are mutually coupled and wherein the first cell and the third cell are not mutually coupled.

In this way, the airframe or part thereof may be flexibly configured. Particularly, the first cell, the second cell and third cell may be interchangeably configured by mutually coupling, as described.

In one example, the airframe or part thereof is repeatedly configurable in the first configuration, in the second configuration and in the third configuration. That is, the first cell, the second cell and the third cell may be mutually coupled and uncoupled, repeatedly.

In one example, an external shape, preferably cross-sectional shape, of the first structural profile tessellates. That is, cells may be arranged adjacently and/or repeatedly, without gaps therebetween. Generally, regular polygons, having congruent straight sides, tessellate. Other shapes tessellate.

In one example, the external shape, preferably cross-sectional shape, of the first structural profile comprises and/or is a hexagon. In this way, a complexity of the first shape is reduced while providing a good balance between mechanical properties and aerodynamic properties.

In one example, the airframe comprises a skin arranged to surround, at least in part, the first cell. In this way, drag in use due to air may be reduced. That is, an aerodynamic property of the airframe may be improved. In one example, the skin is removable from the airframe, for example removably mechanically, magnetically and/or electromagnetically attached to the first structural profile. In this way, the skin for the airframe may be replaced and/or flexibly configured, for example according to mission-specific operational requirements, including in-field reconfiguration. That is, the aerodynamic property of the airframe and/or a shape or profile thereof may be selectively varied. By selectively varying the shape or profile of the airframe, reconnaissance of the airframe, for example by hostile forces, is more complex. Replacement of the skin may be required due to wear due to erosion at, for example hypersonic speeds, and/or damage thereto.

Composite Material

In one example, the set of cells comprises a composite material, for example a fibre reinforced composite material such as including carbon fibre. In one example, the first structural profile and/or the second profile comprises such a composite material. Particularly, the use of advanced composites improves the structural strength, stiffness, corrosion and chemical resistance along with enabling significant reductions in weight. With increased use of carbon fibre in aircraft structures comes an opportunity to introduce novel structures which challenge the traditional design methodologies and manufacturing processes.

In one example, the composite material comprises reinforcement fibres surrounded, at least in part, by a polymeric composition i.e. a fibre reinforced composite material.

In one example, the reinforcement fibres comprise non-metal fibres for example glass fibres such as A-glass, E-glass, E-CR-glass, C-glass, D-glass, R-glass, S-glass, S-2-glass and HS-glass; carbon fibres such as aerospace or industrial grades of IM2A, IM2C, IMS, IM6, IM7, IM8, IM9, IM10, AS4, AS4A, AS4C, AS4D, AS7, HM50 and HM63; aramid fibres such as Kevlar®, Nomex® and Technora®; Ultra-High Molecular Weight Polyethylene (UHMwPE) fibres such as Dyneema®; and/or mixtures thereof. In one example, the reinforcement fibres comprise metal and/or alloy fibres for example titanium, aluminium and/or copper and/or alloys thereof; stainless steel fibres; and/or mixtures thereof. In one example, the reinforcement fibre comprise a mixture of non-metal and metal fibres.

In one example, the reinforcement fibres have a diameter in a range from 2 µm to 100 µm, preferably in a range from 4 µm to 50 µm, more preferably in a range from 5 µm to 20 µm, most preferably in a range from 6 µm to 10 µm, for example 6 µm, 7 µm, 8 µm, 9 µm or 10 µm. Typically, suitable carbon fibres have a diameter in a range from 7 µm to 10 µm and suitable glass fibres have a diameter in a range from 4 µm to 20 µm.

In one example, a volume fraction $V_f$ of the reinforcement fibres is in a range from 10% to 70%, preferably in a range from 20% to 60%, for example 30%, 40% or 50%, by volume of the filament. In this way, a relatively high volume fraction $V_f$ of the first set of reinforcement fibres in the filament may be provided, thereby increasing a mechanical property of the composite material.

In one example, the polymeric composition comprises a first thermoplastic, selected from a group comprising acrylonitrile butadiene styrene (ABS), polylactic acid (PLA), polycarbonate (PC), polyamide (PA), polystyrene (PS), high-density polyethylene (HDPE), PC/ABS, polyethylene terephthalate (PETG), polyphenylsulfone (PPSU), high impact polystyrene (HIPS), polytetrafluoroethylene (PTFE), lignin, rubber, and/or a polyaryletherketone (PAEK), such as polyetherketoneketone (PEKK), polyetheretherketone (PEEK) and polyetherimide (PEI). In one example, the first thermoplastic comprises, consists of and/or is PEKK, PEEK and/or PEI, preferably PEKK and/or PEEK, more preferably PEKK. Compared with PEEK, a PEKK is more robust (i.e. less sensitive) to cooling rate, due, at least in part, to a wider range of acceptable crystallinity. In one example, the first polymeric composition comprises a reactive thermoplastic resin, such as Elium®. Elium is a liquid monomer that may be processed like a thermoset but upon reaction, transforms into a thermoplastic which may be subsequently thermoformed, melted and/or welded. Anionic polymerization of caprolactam (a monomer of polyamide-6, PA-6) is also suitable. Generally, reactive thermoplastic resins may be cured, for example by heating and/or using a catalyst included in the first polymeric composition, thereby reacting molecules thereof to provide a thermoplastic having improved mechanical properties. In one example, the first polymeric composition comprises a second thermoplastic, as described above with respect to the first thermoplastic (i.e. a copolymer).

In one example, the composite material is provided, at least in part, by fibre placement, braiding, knitting, weaving, pull winding and/or pultrusion.

Method of Assembling an Airframe

The second aspect provides a method of assembling an airframe or part thereof comprising a set of modular cells, including a first cell comprising a set of profiles including: a first structural profile having a first length and enclosing a first volume providing a first passageway; and a second profile, having a second length and enclosing a second volume;

wherein the method comprises:

inserting the second profile into the first passageway.

The airframe, the part thereof, the set of modular cells, the first cell, the set of profiles, the first structural profile, the first length, the first volume, the first passageway, the second profile, the second length and/or the second volume may be as described with respect to the first aspect.

In one example, the method comprises and/or is a method of assembling the airframe or part thereof according to the first aspect.

In one example, inserting the second profile into the first passageway comprises slidably inserting the second profile into the first passageway.

In one example, the method comprises removing the second profile from the first passageway. In one example, the method comprises repeatedly inserting the second profile into the first passageway and removing the second profile from the first passageway.

In one example, method comprises:
arranging the airframe or part thereof in a first arrangement, wherein the second profile is received (i.e. inserted) in the first passageway; and
arranging the airframe or part thereof in a second arrangement, wherein the second profile is removed from the first passageway.

In one example, method comprises repeatedly arranging the airframe or part thereof in the first arrangement and in the second arrangement.

In one example, the set of modular cells includes a third cell and the first cell, the second cell and the third cell are mutually coupled, for example as described with respect to the first cell and the second cell. In this way, the airframe or part thereof may be enlarged to include additional cells. Similarly, the airframe or part thereof may be reduced to include fewer cells.

In one example, set of cells includes a third cell and the method comprises:
configuring the airframe or part thereof in a first configuration, wherein the first cell, the second cell and the third cell are mutually coupled; and
configuring the airframe or part thereof in a second configuration, wherein the first cell and the second cell are mutually coupled, wherein the first cell and the third cell are mutually coupled and wherein the second cell and the third cell are not mutually coupled.

In one example, the method comprises repeatedly configuring the airframe or part thereof in the first configuration and in the second configuration.

In one example, the method comprises:
configuring the airframe or part thereof in a third configuration, wherein the first cell and the second cell are mutually coupled, wherein the second cell and the third cell are mutually coupled and wherein the first cell and the third cell are not mutually coupled.

Aircraft

The third aspect provides an aircraft comprising an airframe or part thereof according to the first aspect and/or assembled, at least in part, according to the method of the second aspect.

In one example, the aircraft comprises and/or is a fixed-winged aircraft. In one example, the aircraft comprises and/or is a rotary-winged aircraft.

In one example, the aircraft comprises and/or is an unmanned and/or autonomous vehicle for example an unmanned aerial vehicle, UAV. Generally, an unmanned aircraft (also known as an uncrewed aircraft) is an aircraft without a person on board. An unmanned aircraft can either be a remote controlled aircraft (also known as a remote guided aircraft) or an autonomous aircraft, capable of sensing its environment and navigating autonomously. Preferably, the aircraft is a UAV. An unmanned aerial vehicle (UAV), commonly known as a drone, is an aircraft without a human pilot on board. UAVs are a component of an unmanned aircraft system (UAS); which include a UAV, a ground-based controller, and a system of communications between the two. The flight of UAVs may operate with various degrees of autonomy: either under remote control by a human operator or autonomously by onboard computers. Compared with manned aircraft, UAVs were originally used for missions too 'dull, dirty or dangerous' for humans. While they originated mostly in military applications, their use is rapidly expanding to commercial, scientific, recreational, agricultural, and other applications, such as policing, peacekeeping, and surveillance, product deliveries, aerial photography, smuggling, and drone racing. Civilian UAVs now vastly outnumber military UAVs. UAVs typically fall into one of six functional categories (although multi-role airframe platforms are becoming more prevalent): target and decoy (providing ground and aerial gunnery a target that simulates an enemy aircraft or missile); reconnaissance (providing battlefield intelligence); combat (providing attack capability for high-risk missions); logistics (delivering cargo); research and development (improve UAV technologies); civil and/or commercial UAVs (for example, agriculture, aerial photography, data collection). In one example, the aircraft is a military UAV. UAVs may be classified according to gross take off weight (GTOW): micro air vehicle (MAV) (the smallest UAVs that can weigh less than 1 g); miniature UAV (also called SUAS) (approximately less than 25 kg); and heavier UAVs (i.e. 25 kg or more). In one example, the UAV is a miniature UAV or a heavier UAV. In one example, the UAV has a GTOW in a range from 2.5 kg to 2500 kg, preferably in a range from 5 kg to 500 kg, more preferably in a range from 10 kg to 125 kg, most preferably in a range from 12.5 kg to 50 kg; and/or a payload in a range from 0.5 kg to 500 kg, preferably in a range from 1 kg to 250 kg, more preferably in a range from 2 kg to 100 kg, most preferably in a range from 3 kg to 25 kg; and/or a flight time (i.e. a maximum flight duration) in a range from 0.5 hours to 24 hours, preferably in a range from 0.75 hours to 12 hours, more preferably in a range from 1 hour to 4 hours.

Definitions

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which:

FIGS. 5A-5D schematically depict transverse cross-sections of airframes or parts thereof according to exemplary embodiments;

DETAILED DESCRIPTION OF THE DRAWINGS

Figure 1:
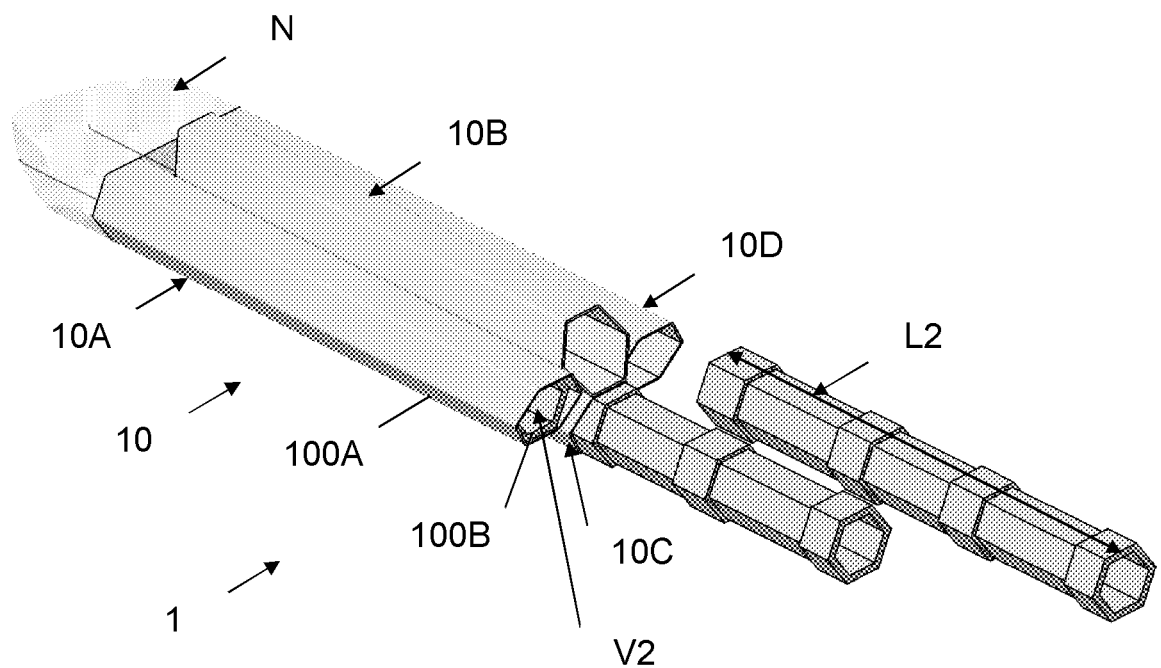
FIG. 1 schematically depicts an airframe or part thereof according to an exemplary embodiment.
Figure 2:
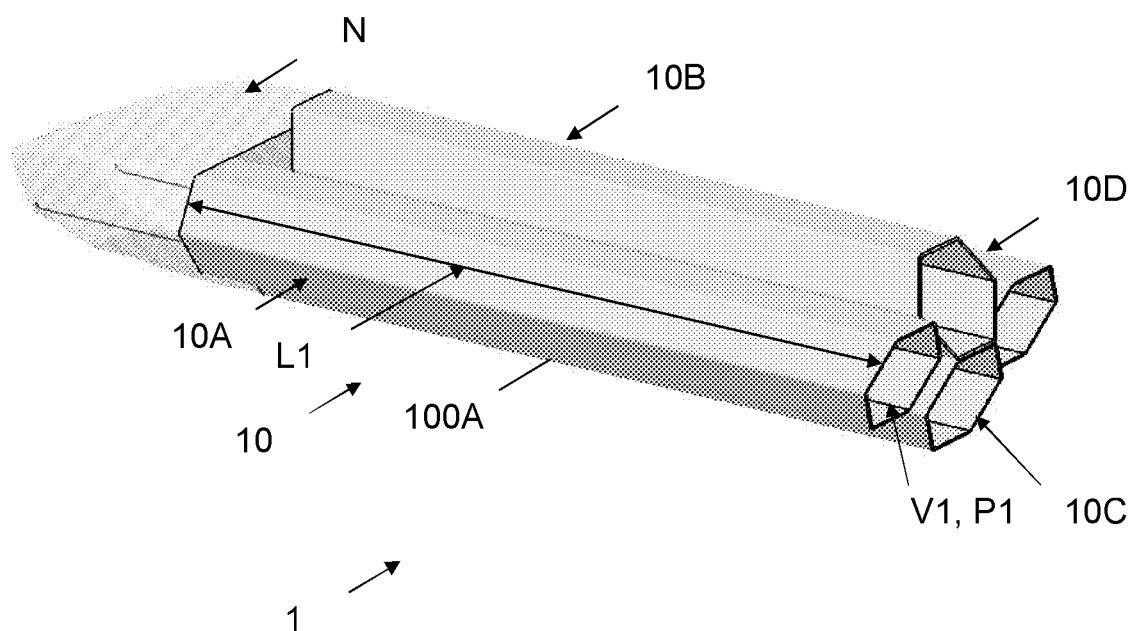
FIG. 2 schematically depicts a rear perspective view of the airframe or part thereof of FIG. 1, in more detail.
Figure 3:
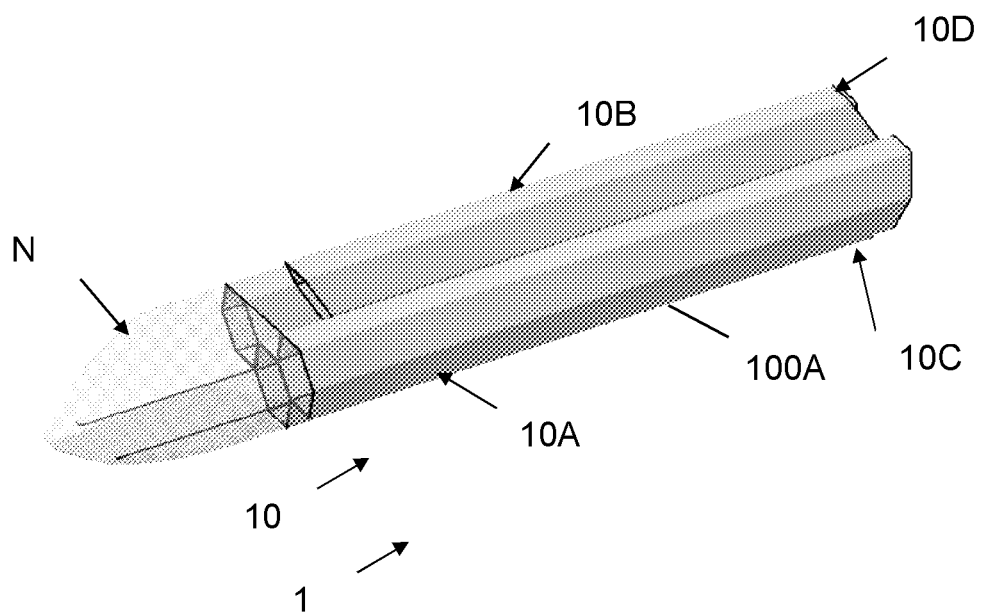
FIG. 3 schematically depicts a front perspective view of the airframe or part thereof of FIG. 1, in more detail.
Figure 4:
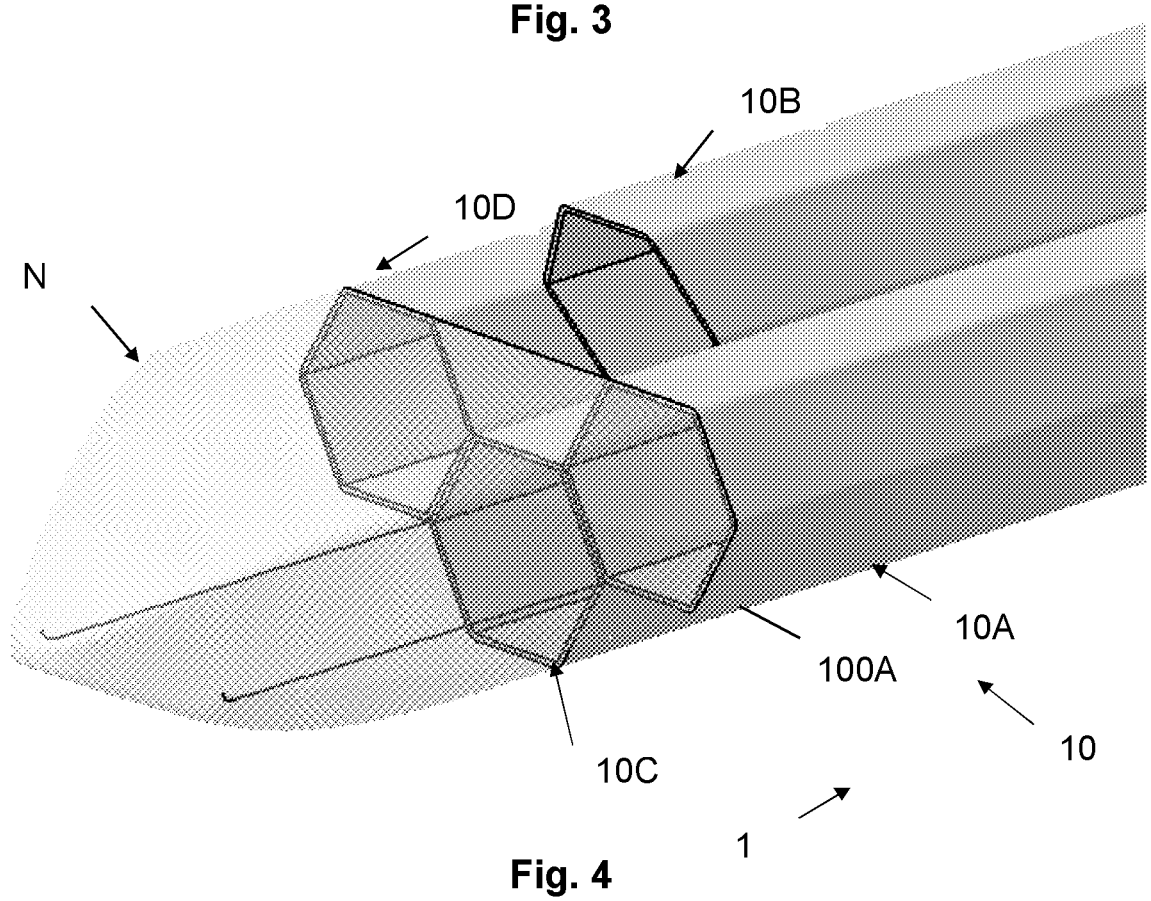
FIG. 4 schematically depicts a side elevation of the airframe or part thereof of FIG. 1, in more detail.

FIG. 1 schematically depicts an airframe 1 or part thereof according to an exemplary embodiment. FIG. 2 schematically depicts a rear perspective view of the airframe 1 or part thereof of FIG. 1, in more detail. FIG. 3 schematically depicts a front perspective view of the airframe 1 or part thereof of FIG. 1, in more detail. FIG. 4 schematically depicts a side elevation of the airframe 1 or part thereof of FIG. 1, in more detail.

The airframe 1 or part thereof comprises a set of modular cells 10, including a first cell 10A comprising a set of profiles 100 including: a first structural profile 100A, having a first length L1 and enclosing a first volume V1 providing a first passageway P1; and a second profile 100B, having a second length L2 and enclosing a second volume V2, wherein the first passageway P1 is arranged to receive the second profile 100B therein.

In this example, the airframe 1 or part thereof comprises and/or provides the fuselage (i.e. an aircraft's main body section). In this example, the airframe 1 or part thereof does not comprise and/or provide the wings.

In this example, the set of modular cells 10 includes 4 modular cells 10A, 10B, 10C, 10D. In this example, the 4 modular cells 10 are each as described with respect to the first cell 10A.

The first cell 10A comprises the set of profiles 100, including the first structural profile 100A and the second profile 100B.

In this example, the first structural profile 100A is arranged to provide, at least in part, the structure of the airframe 1 and to resist, at least in part, internal and/or external forces in one, two or three dimensions. In this example, the first structural profile 100A has a constant cross sectional shape and/or dimension (generally, for example, cross-sectional width, height, diameter and/or area) along the first length L1. In this example, the first structural profile 100A is an outer profile, or example the outermost profile, having an external surface, exposed to the ambient, for example. In this example, the first structural profile 100A partially surrounds the first volume V1, comprising an access port.

In this example, the second profile 100B does not comprise and/or is not a structural profile. In this example, an external shape and/or dimension of the second profile 100B corresponds with an internal shape and/or dimension of the first structural profile 100A i.e. of the first passageway P1. In this example, the second profile 100B has a constant cross sectional shape and/or dimension along the second length L2. In one example, the second profile 100B is an inner profile, or example the innermost profile, not having an external surface exposed to the ambient, for example. In this example, the second profile 100B comprises one or more wall portions having no perforations therethrough, for example providing a sealable enclosure for the second profile 100B.

In this example, the first passageway P1 is arranged to fully (i.e. completely) receive the second profile 100B therein. In this example, the first structural profile comprises an aperture, for example an access door such as at an end thereof, arranged to receive the second profile 100B therethrough.

In this example, the first passageway P1 is arranged to slidably receive the second profile 100B therein.

In this example, the first passageway P1 comprises no bulkheads therein. More generally, in this example, the first passageway P1 comprises no obstructions.

In this example, an external shape, preferably cross-sectional shape and/or dimension, of the second profile 100B corresponds with, for example is the same as, an internal shape, preferably cross-sectional shape and/or dimension, of the first structural profile (i.e. of the first passageway P1).

In this example, the second volume V2 is configured to comprise and/or comprises a propulsor, a fuel tank, electronics for a control system, surveillance equipment, munitions and/or part thereof.

In this example, the airframe 1 or part thereof is arrangeable in:
a first arrangement, wherein the second profile 100B is received (i.e. inserted) in the first passageway P1; and
a second arrangement, wherein the second profile 100B is removed from the first passageway P1.

In this example, the airframe 1 or part thereof is repeatedly arrangeable in the first arrangement and in the second arrangement.

In this example, the set of modular cells 10 includes a second cell 10B. The second cell 10B is as described with respect to the first cell 10A.

In this example, the first cell 10A and the second cell 10B are mutually coupled. In this example, the first cell 10A and the second cell 10B are mutually coupled mechanically, for example using mechanical fasteners such as non-releasable fasteners for example non-threaded fasteners (e.g. rivets) and/or releasable fasteners for example clips, rings, toggle bolts, clamps and/or threaded fasteners (e.g. bolts and nuts).

In this example, the first cell 10A and the second cell 10B are mutually releasably coupled, for example mechanically such as using releasable mechanical fasteners.

In this example, the first cell 10A and the second cell 10B are mutually reconfigurably coupled, for example mechanically, as described above. In this example, the first cell 10A and the second cell 10B are mutually reconfigurably coupled mechanically, using releasable fasteners positioned in predetermined positions.

In this example, the first cell 10A and the second cell 10B are mutually interlockably coupled, for example mechanically.

In this example, the set of modular cells 10 includes a third cell 10C and the first cell 10A, the second cell 10B and the third cell 10C are mutually coupled, for example as described with respect to the first cell 10A and the second cell 10B. In this example, the set of modular cells 10 includes a fourth cell 10D and the second cell 10B, the third cell 10C and the fourth cell 10D are mutually coupled, for example as described with respect to the first cell 10A, the second cell 10B and the third cell 10C.

In this example, the airframe 1 or part thereof is configurable in:
a first configuration, wherein the first cell 10A, the second cell 10B and the third cell 10C are mutually coupled; and
a second configuration, wherein the first cell 10A and the second cell 10B are mutually coupled, wherein the first cell 10A and the third cell 10C are mutually coupled and wherein the second cell 10B and the third cell 10C are not mutually coupled.

In this example, the airframe 1 or part thereof is repeatedly configurable in the first configuration and in the second configuration. That is, the first cell 10A, the second cell 10B and the third cell 10C may be mutually coupled and uncoupled, repeatedly.

In this example, the airframe 1 or part thereof is configurable in:
a third configuration, wherein the first cell 10A and the second cell 10B are mutually coupled, wherein the second cell 10B and the third cell 10C are mutually coupled and wherein the first cell 10A and the third cell 10C are not mutually coupled.

In this example, the airframe 1 or part thereof is repeatedly configurable in the first configuration, in the second configuration and in the third configuration. That is, the first cell 10A, the second cell 10B and the third cell 10C may be mutually coupled and uncoupled, repeatedly.

In this example, an external shape, preferably cross-sectional shape, of the first structural profile 100A tessellates.

In this example, the external shape, preferably cross-sectional shape, of the first structural profile 100A comprises and/or is a hexagon.

In this example, the set of cells 10 comprises a composite material, for example a fibre reinforced composite material such as including carbon fibre. In this example, the first structural profile 100A and/or the second profile 100B comprises such a composite material.

FIGS. 5A-5D schematically depict transverse cross-sections of airframes or parts thereof according to exemplary embodiments.

In more detail, FIG. 5A schematically depicts a transverse cross-section of an airframe 5A or part thereof wherein the set of cells 10 includes 1 cell 10A.

In more detail, FIG. 5B schematically depicts a transverse cross-section of an airframe 5B or part thereof wherein the set of cells 10 includes 3 cells 10A, 10B, 10C wherein the first cell 10A and the second cell 10B are mutually coupled, wherein the first cell 10A and the third cell 10C are mutually coupled and wherein the second cell 10B and the third cell 10C are not mutually coupled.

In more detail, FIG. 5C schematically depicts a transverse cross-section of an airframe 5C or part thereof wherein the set of cells 10 includes 4 cells 10A, 10B, 10C, 10D wherein the first cell 10A and the second cell 10B are mutually coupled, wherein the first cell 10A and the third cell 10C are mutually coupled, wherein the second cell 10B and the third cell 10C are not mutually coupled, wherein the first cell 10A and the fourth cell 10D are mutually coupled, wherein the second cell 10B and the fourth cell 10D are mutually coupled and wherein the third cell 10C and the fourth cell 10D are mutually coupled.

In more detail, FIG. 5D schematically depicts a transverse cross-section of an airframe 5D or part thereof wherein the set of cells 10 includes 5 cells 10A, 10B, 10C, 10D, 10E wherein the first cell 10A and the second cell 10B are mutually coupled, wherein the first cell 10A and the third cell 10C are mutually coupled, wherein the first cell 10A and the fourth cell 10D are mutually coupled, wherein the first cell 10A and the fifth cell 10E are mutually coupled, wherein the second cell 10B and the third cell 10C are mutually coupled, wherein the fourth cell 10D and the fifth cell 10E are mutually coupled, wherein the second cell 10B and the fourth cell 10D are not mutually coupled, wherein the second cell 10B and the fifth cell 10E are not mutually coupled, wherein the third cell 10C and the fourth cell 10D are not mutually coupled and wherein the third cell 10B and the fifth cell 10E are not mutually coupled.

Figure 6A:
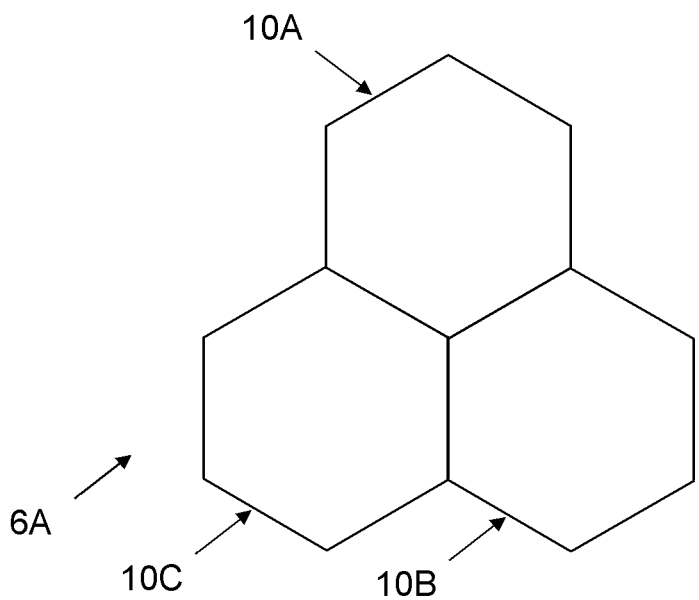
FIGS. 6A-6B schematically depict transverse cross-sections of airframes or parts thereof according to exemplary embodiments.
Figure 6B:
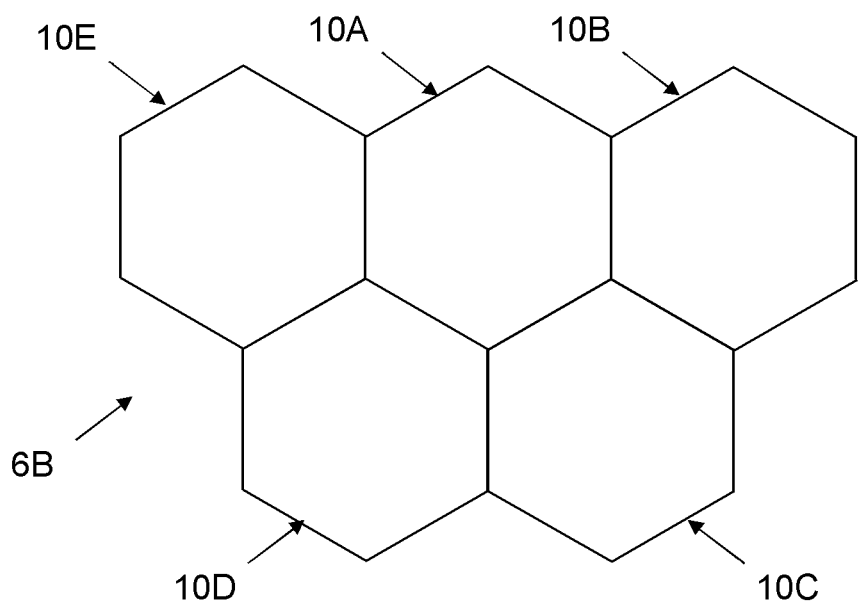

FIGS. 6A-6B schematically depict transverse cross-sections of airframes or parts thereof according to exemplary embodiments.

In more detail, FIG. 6A schematically depicts a transverse cross-section of an airframe 6A or part thereof wherein the set of cells 10 includes 3 cells 10A, 10B, 10C wherein the first cell 10A and the second cell 10B are mutually coupled, wherein the first cell 10A and the third cell 10C are mutually coupled and wherein the second cell 10B and the third cell 10C are mutually coupled.

In more detail, FIG. 6B schematically depicts a transverse cross-section of an airframe 6B or part thereof wherein the set of cells 10 includes 5 cells 10A, 10B, 10C, 10D, 10E wherein the first cell 10A and the second cell 10B are mutually coupled, wherein the first cell 10A and the third cell 10C are mutually coupled, wherein the first cell 10A and the fourth cell 10D are mutually coupled, wherein the first cell 10A and the fifth cell 10E are mutually coupled, wherein the second cell 10B and the third cell 10C are mutually coupled, wherein the third cell 10C and the fourth cell 10D are mutually coupled, wherein the fourth cell 10D and the fifth cell 10E are mutually coupled, wherein the second cell 10B and the fourth cell 10E are not mutually coupled, wherein the second cell 10B and the fifth cell 10E are not mutually coupled and wherein the third cell 10C and the fifth cell 10D are not mutually coupled.

Figure 7:
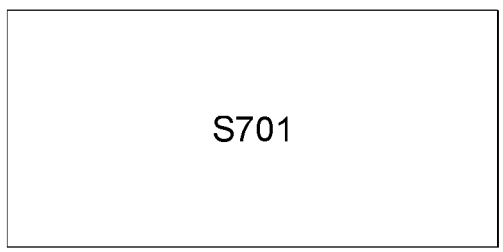
FIG. 7 schematically depicts a method of assembling an airframe or part thereof according to an exemplary embodiment.

FIG. 7 schematically depicts a method of assembling an airframe or part thereof according to an exemplary embodiment. Particularly, the method is of assembling an airframe or part thereof comprising a set of modular cells, including a first cell comprising a set of profiles including: a first structural profile and enclosing a first volume providing a first passageway; and a second profile, having a second length and enclosing a second volume.

At S701, the second profile is inserted into the first passageway.

The method may comprise any of the steps described herein.

Figure 8A:
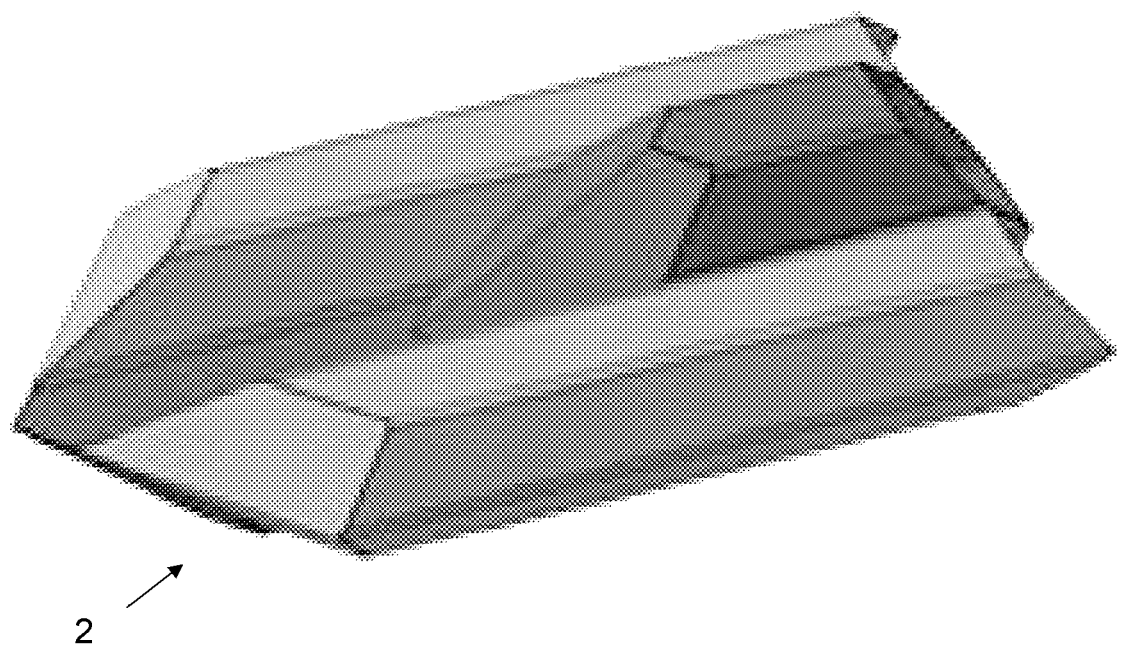
FIGS. 8A-8B schematically depict perspective views of a watercraft frame or parts thereof according to exemplary embodiments.
Figure 8B:
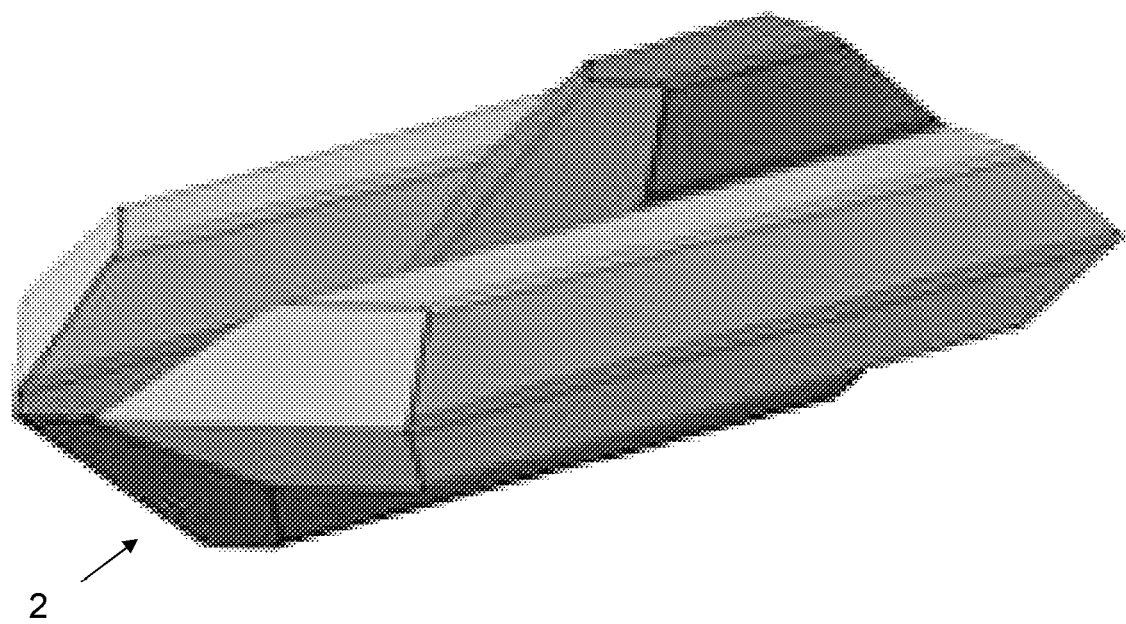

FIGS. 8A-8B schematically depict perspective views of a watercraft frame 2 or parts thereof according to exemplary embodiments.

The watercraft frame 2 is generally as described with respect to the airframe 1 of FIG. 1.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

What is claimed is:

1. An airframe or part thereof comprising a set of modular cells, including a first cell comprising a set of profiles including:
   a first structural profile, having a first length and enclosing a first volume providing a first passageway; and
   a second profile, having a second length and enclosing a second volume, wherein the first passageway is arranged to receive the second profile therein;
   wherein the set of modular cells includes a second cell;
   wherein the first cell and the second cell are longitudinally mutually coupled, abutting along their adjacent exterior surfaces; and
   wherein the first cell and the second cell are mutually reconfigurably coupled mechanically.

2. The airframe according to claim 1, wherein the first passageway is arranged to slidably receive the second profile therein.

3. The airframe according to claim 1, wherein the first passageway comprises no bulkheads therein.

4. The airframe according to claim 1, wherein an external cross-sectional shape of the second profile corresponds with an internal cross-sectional shape of the first structural profile.

5. The airframe according to claim 1, wherein the second volume comprises a propulsor, a fuel tank, electronics for a control system, surveillance equipment, munitions and/or part thereof.

6. The airframe according to claim 1, wherein the first cell and the second cell are mutually releasably coupled mechanically.

7. The airframe according to claim 1, wherein the set of modular cells includes a third cell and wherein the first cell, the second cell and the third cell are longitudinally mutually coupled, abutting along their adjacent exterior surfaces.

8. The airframe according to claim 1, wherein an external cross-sectional shape of the first structural profile tessellates; whereby the cross-sectional shape of the first structural profile of the first cell and the second cell are arranged adjacently, without gaps therebetween.

9. The airframe according to claim 8, wherein the external cross-sectional shape of the first structural profile comprises and/or is a hexagon.

10. The airframe according to claim 1, comprising a skin arranged to surround, at least in part, the first cell.

11. The airframe according to claim 1, wherein said airframe or part thereof comprises a fuselage, and does not comprise wings.

12. The airframe according to claim 1, wherein said airframe comprises a rotary-winged aircraft.

13. The airframe according to claim 1, wherein said first structural profile is an outer profile.

14. The airframe according to claim 1, wherein said first structural profile is an outermost profile, having an external surface exposed to ambient.

15. The airframe according to claim 1, wherein said first passageway is arranged to fully receive said second profile therein.

16. The airframe according to claim 1, wherein said second profile is not a structural profile.

17. The airframe according to claim 1, wherein said second volume comprises a propulsor.

18. The airframe according to claim 1, whereby an aircraft comprising said the airframe or part thereof can be flexibly configured, supporting delayed differentiation.

19. An airframe or part thereof comprising a set of modular cells, including a first cell comprising a set of profiles including:
   a first structural profile, having a first length and enclosing a first volume providing a first passageway; and
   a second profile, having a second length and enclosing a second volume, wherein the first passageway is arranged to receive the second profile therein;
   wherein the set of modular cells includes a second cell;
   wherein the first cell and the second cell are longitudinally mutually coupled, abutting along their adjacent exterior surfaces; and
   wherein the first cell and the second cell are mutually interlockably coupled, mechanically.

20. A method of assembling an airframe or part thereof comprising a set of modular cells, including a first cell comprising a set of profiles including:
   a first structural profile having a first length and enclosing a first volume providing a first passageway; and a second profile, having a second length and enclosing a second volume;
   wherein the first passageway is arranged to receive the second profile therein;
   wherein the set of modular cells includes a second cell;
   wherein the first cell and the second cell are longitudinally mutually coupled along their, abutting adjacent exterior surfaces; and
   wherein the first cell and the second cell are mutually reconfigurably coupled, mechanically;
   wherein the method comprises:
   inserting the second profile into the first passageway.

* * * * *